US012640763B2

(12) United States Patent (10) Patent No.: US 12,640,763 B2
Levanen (45) Date of Patent: May 26, 2026

(54) MOBILE COMMUNICATION SYSTEM

(71) Applicant: Nokia Technologies Oy, Espoo (FI)

(72) Inventor: Toni Levanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 520 days.

(21) Appl. No.: 18/044,159

(22) PCT Filed: Sep. 2, 2021

(86) PCT No.: PCT/EP2021/074242
§ 371 (c)(1),
(2) Date: Mar. 6, 2023

(87) PCT Pub. No.: WO2022/053385
PCT Pub. Date: Mar. 17, 2022

(65) Prior Publication Data
US 2023/0275607 A1 Aug. 31, 2023

(30) Foreign Application Priority Data
Sep. 8, 2020 (FI) ...................................... 20205869

(51) Int. Cl.
H04B 1/10 (2006.01)
H04L 27/26 (2006.01)

(52) U.S. Cl.
CPC ....... H04B 1/1036 (2013.01); H04L 27/2691 (2013.01)

(58) Field of Classification Search
CPC ............ H04L 27/2655; H04L 27/2691; H04B 1/1027; H04B 1/1036; H04B 1/12; H04B 17/345; H04B 17/364; H03D 3/002
See application file for complete search history.

(56) References Cited

U.S. PATENT DOCUMENTS 9,756,657 B2 9/2017 Jiang et al.
2017/0303303 A1 10/2017 Yang et al.
(Continued)

FOREIGN PATENT DOCUMENTS

BR 102013030364 A2 9/2015
CN 101098186 B 5/2012
(Continued)

OTHER PUBLICATIONS

"3rd Generation Partnership Project; Technical Specification Group Radio Access Network; NR; Base Station (BS) radio transmission and reception (Release 16)", 3GPP TS 38.104, V16.3.0, Mar. 2020, pp. 1-258.
(Continued)

*Primary Examiner* — Nader Bolourchi
(74) *Attorney, Agent, or Firm* — Nokia Technologies Oy

(57) ABSTRACT

An apparatus, method and computer program is described comprising: obtaining time domain samples of a received radio frequency signal of a mobile communication system, wherein the radio frequency signal comprises a Physical Random Access Channel; determining an estimated power distribution for the time domain samples; determining a filtering threshold value at which a time domain sample is deemed to be due to interference, based on a defined probability level of the estimated power distribution; defining a filtering mask based on the time domain samples and the filtering threshold; and applying the filtering mask to the time domain samples to generate a filtered signal samples, wherein the filtering mask is configured to attenuate time domain samples that are above the filtering threshold.

19 Claims, 9 Drawing Sheets

(56) References Cited

U.S. PATENT DOCUMENTS

| | | | |
|---|---|---|---|
| 2019/0110313 A1 | 4/2019 | Islam et al. | |
| 2023/0344691 A1* | 10/2023 | Levanen | H04L 27/2602 |

FOREIGN PATENT DOCUMENTS

| | | |
|---|---|---|
| CN | 105432049 A | 3/2016 |
| KR | 100766018 B1 | 10/2007 |
| WO | 2012/004663 A2 | 1/2012 |
| WO | 2019/195476 A1 | 10/2019 |
| WO | 2022/096778 A1 | 5/2022 |

OTHER PUBLICATIONS

"3rd Generation Partnership Project; Technical Specification Group RAN; NR; Base Station (BS) conformance testing Part 1: Conducted conformance testing (Release 15)", 3GPP TS 38.141, V0.0.3, Aug. 2017, 14 pages.

"3rd Generation Partnership Project; Technical Specification Group RAN; NR; Base Station (BS) conformance testing Part 2: Radiated conformance testing (Release 15)", 3GPP TS 38.141, V0.0.3, Aug. 2017, 14 pages.

"3rd Generation Partnership Project; Technical Specification Group Radio Access Network; NR; Physical channels and modulation (Release 16)", 3GPP TS 38.211, V16.1.0, Mar. 2020, pp. 1-130.

Morohashi et al., "A high-performance RACH detection scheme for random access overload in LTE-Advanced", IEEE Conference on Standards for Communications and Networking (CSCN), Oct. 28-30, 2015, 6 pages.

"Interference between Data and RACH in EUTRA", 3GPP TSG RAN WG1 #47bis, R1-070256, Agenda Item: 6.5.1, Texas Instruments, Jan. 15-19, 2007, pp. 1-7.

"Discussion on initial access signals and channels", 3GPP TSG RAN WG1 #97, R1-1906127, Agenda Item: 7.2.2.1.1, vivo, May 13-17, 2019, 13 pages.

Office action received for corresponding Finnish Patent Application No. 20205869, dated Mar. 30, 2021, 7 pages.

Office action received for corresponding Finnish Finnish Patent Application No. 20205869, dated Sep. 7, 2021, 2 pages.

International Search Report and Written Opinion received for corresponding Patent Cooperation Treaty Application No. PCT/EP2021/074242, dated Dec. 8, 2021, 12 pages.

De Figueiredo et al., "Multi-Stage Based Cross-Correlation Peak Detection for LTE Random Access Preambles", Revista Telecomunicações, vol. 15, No. 02, Oct. 2013, pp. 21-27.

Pham et al., "A proposed preamble detection algorithm for 5G-PRACH", International Conference on Advanced Technologies for Communications (ATC), Oct. 17-19, 2019, pp. 210-214.

Office action received for corresponding European Patent Application No. 21770219.0, dated Mar. 11, 2025, 7 pages.

Office action received for corresponding Chinese Patent Application No. 202180074721.5, dated Apr. 1, 2026, 10 pages of office action and 8 pages of translation available.

* cited by examiner

*40*

| Obtain TD samples of RF signal | *41* |

| Estimate power distribution | *42* |

| Determine filtering threshold | *43* |

| Define filtering mask | *44* |

| Apply filtering mask | *45* |

| Detect PRACH preamble | *46* |

MOBILE COMMUNICATION SYSTEM

RELATED APPLICATION

This application was originally filed as PCT Application No. PCT/EP2021/074242, filed on Sep. 2, 2021, which claims priority from FI application No. 20205869, filed on Sep. 8, 2020, each of which is incorporated herein by reference in its entirety.

FIELD

This present specification relates to mobile communication systems.

BACKGROUND

The detection of a Physical Random Access Channel (PRACH) preamble signals is known. However, there remains a need for further developments in this field.

SUMMARY

In a first aspect, this specification describes an apparatus comprising means for performing: obtaining time domain samples of a received radio frequency signal of a mobile communication system, wherein the radio frequency signal comprises a Physical Random Access Channel (PRACH); determining an estimated power distribution for the time domain samples; determining a filtering threshold value at which a time domain sample is deemed to be due to interference, based on a defined probability level of the estimated power distribution; defining a filtering mask based on the time domain samples and the filtering threshold; and applying the filtering mask to the time domain samples to generate a filtered signal samples, wherein the filtering mask is configured to attenuate time domain samples that are above the filtering threshold. A PRACH preamble may be transmitted using the PRACH.

The filtering mask may be configured to null the time domain samples that are above the filtering threshold. Alternatively, or in addition, the filtering mask may be configured to attenuate time domain samples that neighbour said time domain samples that are above the filter threshold.

The estimated power distribution for the time domain samples may be a Rayleigh distribution. Furthermore, some example embodiment further comprise means for performing: determining a Rayleigh fading scale parameter of the time domain samples for use in generating said estimate power distribution. The Rayleigh fading scale parameter may, for example, be determined based on a median value of said time domain samples.

Some example embodiments further comprise means for performing: determining whether to activate said applying said filtering mask to the time domain samples to generate the filtered signal samples. The said determination may be based on a received enable signal and/or on a determination of whether peaks above a threshold level are detected within said time domain samples.

Some example embodiments further comprise means for performing: generating a combined filter mask in the event of overlapping masks. The combined filter mask may be generated in a number of ways, such as by selecting a smaller of available masking levels or based on an average masking level.

Some example embodiments further comprise means for performing: defining the probability level of the estimated power distribution Some example embodiments further comprise means for performing: detecting a Physical Random Access Channel preamble within the filtered radio frequency signal.

The said means may comprise: at least one processor; and at least one memory including computer program code, the at least one memory and the computer program configured, with the at least one processor, to cause the performance of the apparatus.

In a second aspect, this specification describes a method comprising: obtaining time domain samples of a received radio frequency signal of a mobile communication system, wherein the radio frequency signal comprises a Physical Random Access Channel; determining an estimated power distribution for the time domain samples; determining a filtering threshold value at which a time domain sample is deemed to be due to interference, based on a defined probability level of the estimated power distribution; defining a filtering mask based on the time domain samples and the filtering threshold; and applying the filtering mask to the time domain samples to generate a filtered signal samples, wherein the filtering mask is configured to attenuate time domain samples that are above the filtering threshold.

The filtering mask may be configured to null the time domain samples that are above the filtering threshold. Alternatively, or in addition, the filtering mask may be configured to attenuate time domain samples that neighbour said time domain samples that are above the filter threshold.

The estimated power distribution for the time domain samples may be a Rayleigh distribution. Furthermore, some example embodiment further comprise determining a Rayleigh fading scale parameter of the time domain samples for use in generating said estimate power distribution. The Rayleigh fading scale parameter may, for example, be determined based on a median value of said time domain samples.

Some example embodiments further comprise means for performing: determining whether to activate said applying said filtering mask to the time domain samples to generate the filtered signal samples. The said determination may be based on a received enable signal and/or on a determination of whether peaks above a threshold level are detected within said time domain samples.

Some example embodiments further comprise generating a combined filter mask in the event of overlapping masks.

Some example embodiments further comprise: defining the probability level of the estimated power distribution Some example embodiments further comprise: detecting a Physical Random Access Channel preamble within the filtered radio frequency signal.

In a third aspect, this specification describes computer-readable instructions which, when executed by computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: obtaining time domain samples of a received radio frequency signal of a mobile communication system, wherein the radio frequency signal comprises a Physical Random Access Channel; determining an estimated power distribution for the time domain samples; determining a filtering threshold value at which a time domain sample is deemed to be due to interference, based on a defined probability level of the estimated power distribution; defining a filtering mask based on the time domain samples and the filtering threshold; and applying the filtering mask to the time domain samples to generate a filtered signal samples, wherein the filtering mask is configured to attenuate time domain samples that are above the filtering threshold.

In a seventh aspect, this specification describes an apparatus comprising means (such as an input means) for obtaining time domain samples of a received radio frequency signal of a mobile communication system, wherein the radio frequency signal comprises a Physical Random Access Channel; means (such as a processor) for determining an estimated power distribution for the time domain samples; means (such as the processor) for determining a filtering threshold value at which a time domain sample is deemed to be due to interference, based on a defined probability level of the estimated power distribution; means (such as the processor) for defining a filtering mask based on the time domain samples and the filtering threshold; and means (such as a filter) for applying the filtering mask to the time domain samples to generate a filtered signal samples, wherein the filtering mask is configured to attenuate time domain samples that are above the filtering threshold.

BRIEF DESCRIPTION OF THE DRAWINGS

Example embodiments will now be described, by way of example only, with reference to the following schematic drawings, in which.

DETAILED DESCRIPTION

Figure 1:
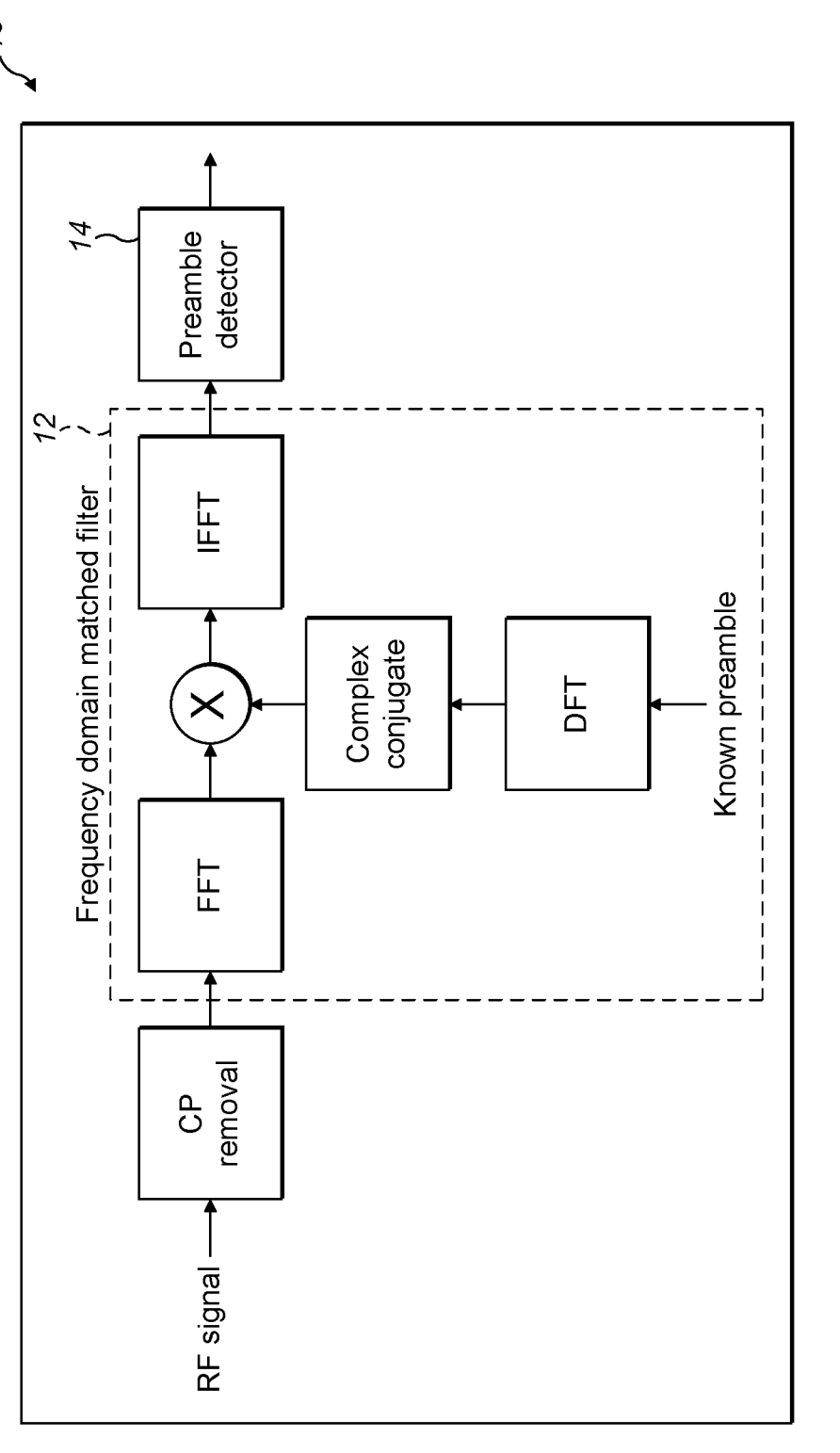
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, that may be used for physical random access channel (PRACH) detection. The system 10 comprises a frequency domain matched filter 12 and preamble detector 14.

PRACH detection systems, such as the system 10, can suffer from noise that can make preamble detection challenging.

Figure 2:
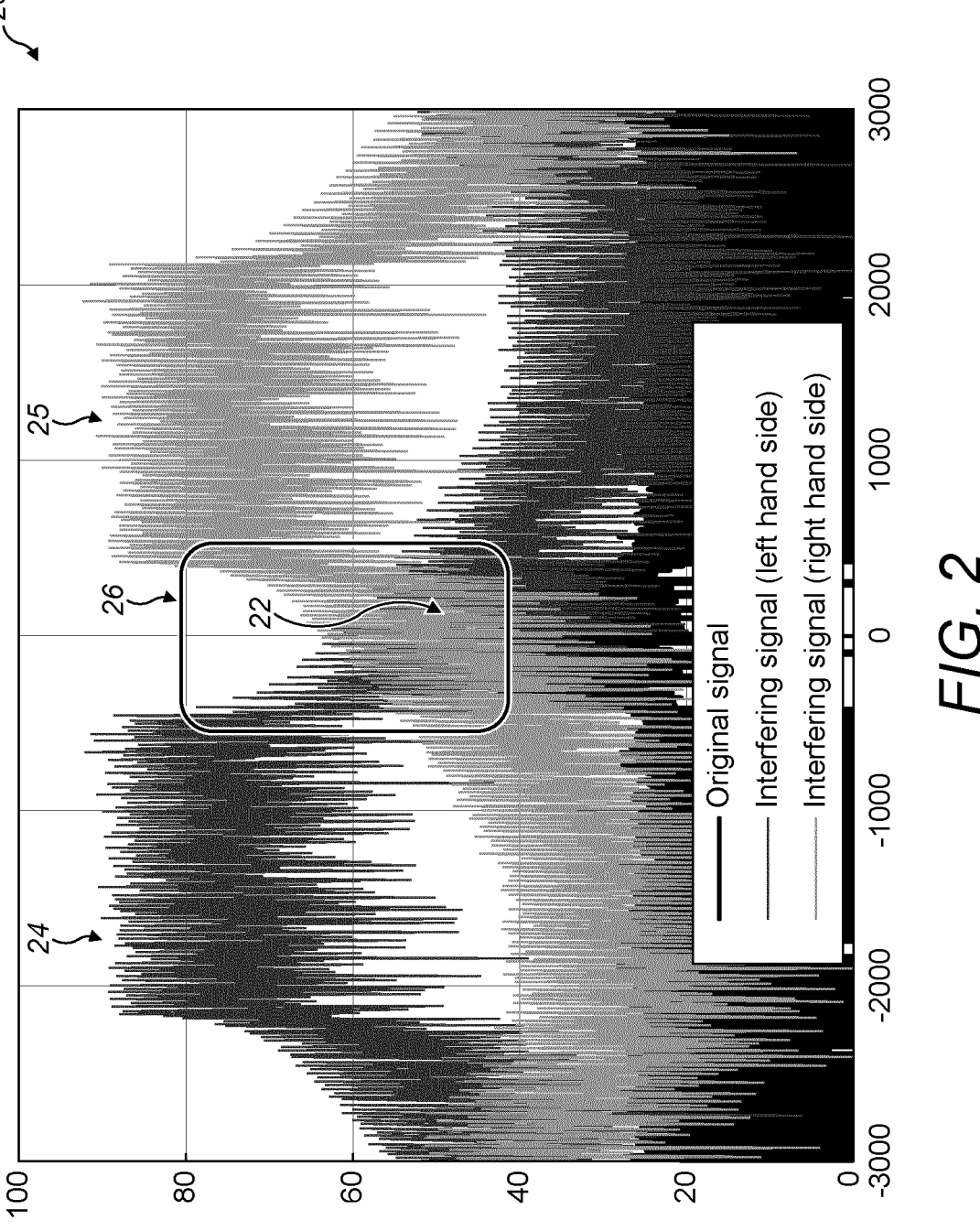
FIGS. 2 and 3 are plots showing features of example embodiments.

FIG. 2 is a plot, indicated generally by the reference numeral 20, showing features of an example embodiment. More specifically, the plot 20 shows how the performance of PRACH preambles can be degraded due to interference on top of the PRACH induced by simultaneous Physical Uplink Shared Channel (PUSCH) transmissions on neighbouring physical resource blocks (PRBs).

The plot 20 shows a PRACH signal 22, a first neighbouring PUSCH signal 24 and a second neighbouring PUSCH signal 25 (with the first and second neighbouring signals 24 and 25 being transmitted using lower and higher frequency channels respectively). The plot 20 also shows a zone 26 where interference due to the PUSCH signals 24 and 25 cannot be filtered out without impacting on the PRACH signal.

It has been noted that the larger the scheduled uplink modulating and coding scheme (MCS) is in the neighbouring physical resource blocks (PRBs), the larger is the difference in the received power spectral density (PSD) between PRACH preamble and PUSCH signal. Also, if repetitive RACH preambles are used, the signal to noise ratio (SNR) requirement for PRACH detection is decreased, again increasing the power difference between received PRACH preamble PSD level and PUSCH PSD level.

Figure 3:
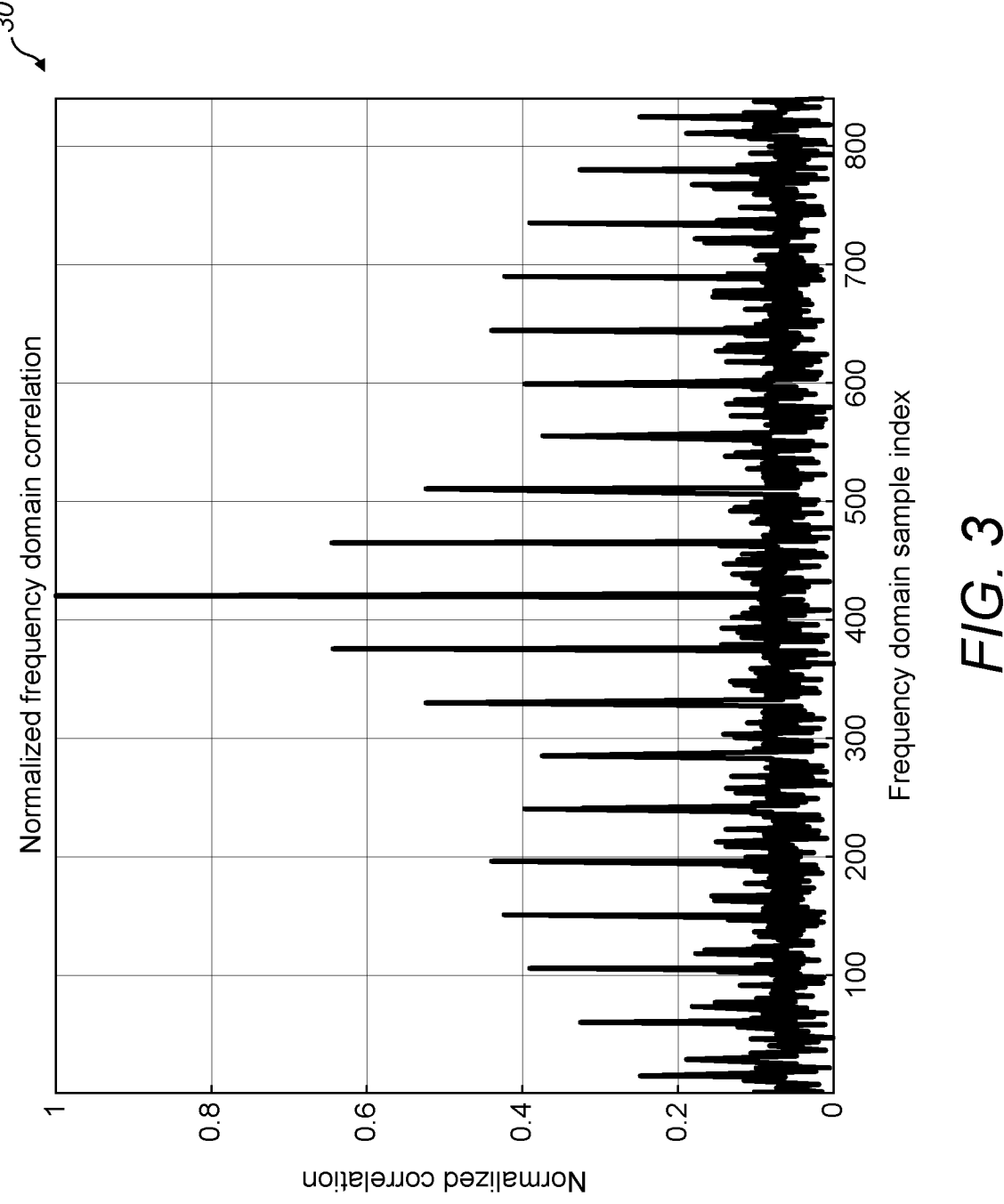

FIG. 3 is a plot, indicated generally by the reference numeral 30, showing features of an example embodiment. The plot 30 shows the circular frequency correlation of a received RACH preamble in the presence of PUSCH interference.

It can be seen in the plot 30 that interference caused by PUSCH signals with larger subcarrier spacing (SCS) than in RACH random access channel (RACH) preamble causes circularly correlated frequency domain interference on top of received RACH preamble. This is observed as varying spikes in the circular frequency domain correlation response as shown in the plot 30. In the time domain, this creates "cyclic" impulse-like interference.

As discussed in detail below, a simple scheme is proposed to estimate a nulling level (or threshold), wherein samples with peaks larger than the nulling level are nulled. In addition, samples in the neighborhood of the time domain nulled samples may be attenuated to further improve the performance.

Figure 4:
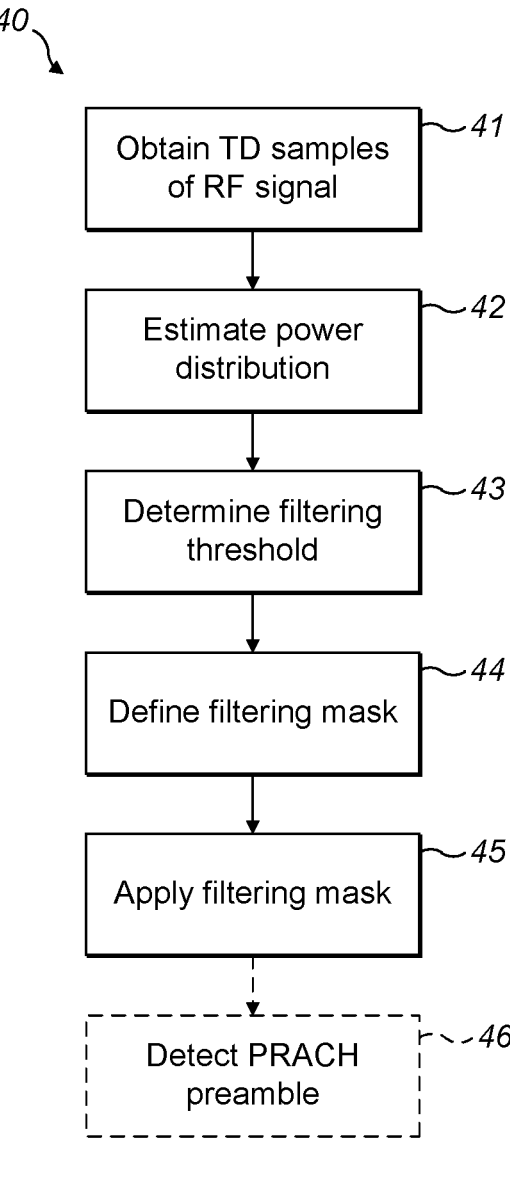
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 41, where time domain (TD) samples of a received radio frequency signal of a mobile communication system are obtained. The radio frequency signal comprises a Physical Random Access Channel (PRACH).

At operation 42, an estimated power distribution for the time domain samples is determined. As discussed in detail below, the power distribution may take the form of a Rayleigh power distribution.

A filtering threshold value is determined at operation 43. The filtering threshold value is set at a level at which a time domain sample is deemed to be due to interference, based on a defined probability level of the estimated power distribution.

At operation 44, a filtering mask is defined based on the time domain samples and the filtering threshold set in the operation 43. For example, the filtering mask may be configured to null the time domain samples that are above the filtering threshold. The filtering mask is applied to the time domain samples at operation 45, in order to generate filtered signal samples, wherein the filtering mask is configured to attenuate time domain samples that are above the filtering threshold.

An alternative to the time domain peak nulling of the operation 44 would be to derive a decorrelation filter in the frequency domain that seeks to remove all other peaks except the centre peak in the plot 30 described above.

At optional operation 46, a PRACH preamble is detected within the filtered radio frequency signal.

Figure 5:
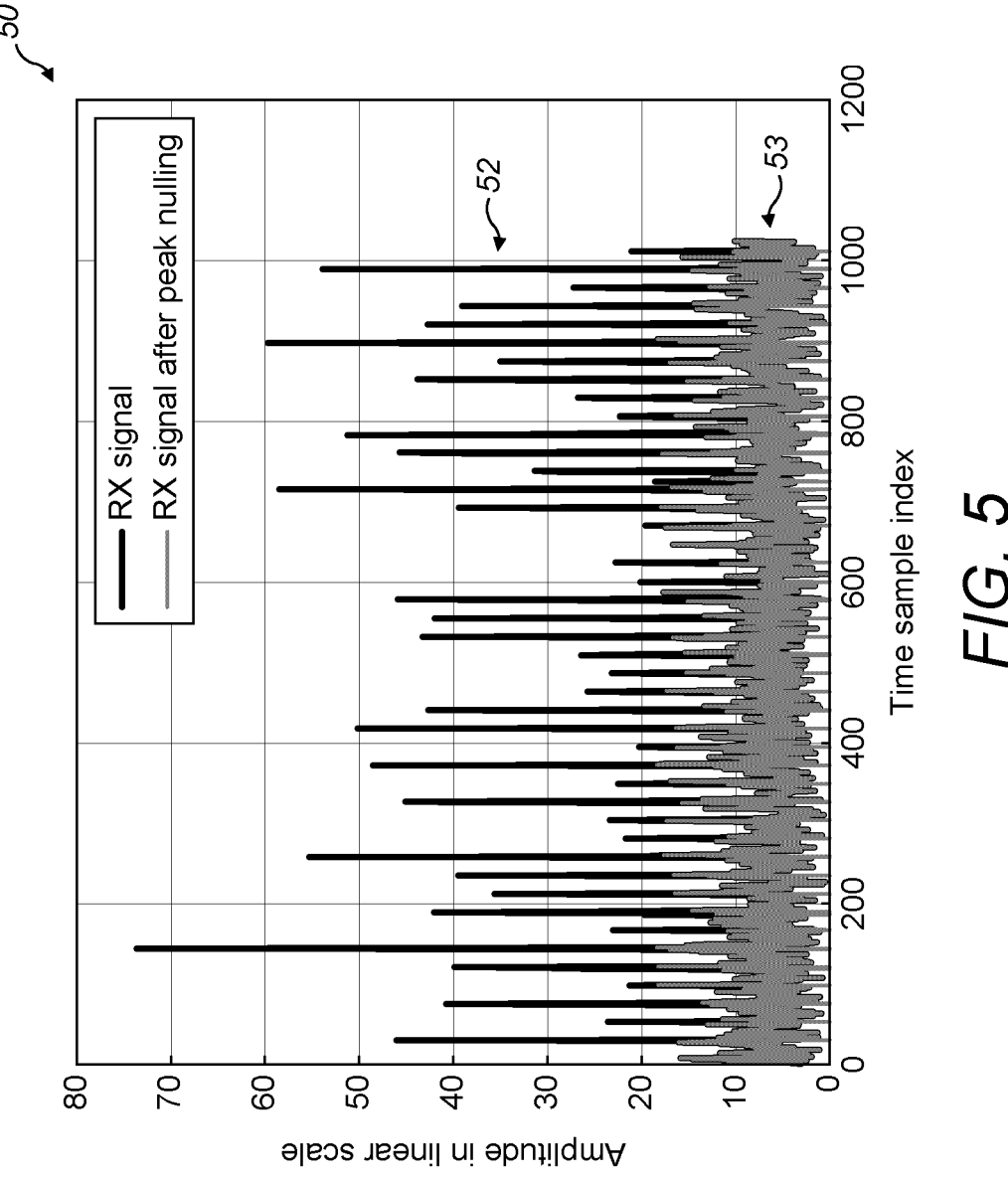
FIGS. 5 to 8 are plots showing features of example embodiments.

FIG. 5 is a plot, indicated generally by the reference numeral 50, showing features of an example embodiment. The plot 50 is a time domain illustration of the received RACH preamble. The plot 50 comprises a first plot 52 showing received time domain signals and a second plot 53 showing the received signal after the application of the filtering mask of the algorithm 40 to the received time domain signals.

The PUSCH interference, as indicated by the first plot 52, is a cyclic, impulse-like interference.

The time domain response for the received frequency domain samples is obtained through zero padding and IFFT, and may be defined as:

$$y = \sqrt{N_{PRACH}} \; IFFT\left(\left[x(0), x(1), \ldots, x\left(\text{floor}\left(\frac{N_{PRACH}}{2}\right)\right), 0, \ldots, 0,\right.\right.$$
$$\left.\left. x\left(\text{floor}\left(\frac{N_{PRACH}}{2}\right)+1\right), \ldots, x(N_{PRACH}-1)\right]^{T}\right)$$

where we have assumed that x frequency domain presentation is DC first and high frequency components are thus in the middle of the frequency domain presentation.

The starting point for an example implementation of the algorithm 40 is the assumption that the distribution of the received signal power should be Rayleigh distributed, which typically holds well especially in signals having low signal to noise ratio (SNR). Then, the Rayleigh fading scale parameter, $\sigma$, is estimated through the median value of the received signal, defined as:

$$\hat{\sigma} = \text{median}(\|y\|^2)/\sqrt{2\log(2)} \tag{2}$$

It should be noted that the use of median was noted to be better in some example embodiments, due to the large peaks in time domain, which distort the scale parameter estimation with traditional unbiased estimator. Nevertheless, the use of the median value is not essential to all example embodiments.

A significant parameter tuning the performance of the proposed algorithm is the peak nulling probability level, $\xi_{null} \in [0,1]$. This parameter sets the probability level at which we consider mainly interference peaks to exist. In the evaluations presented, a probability level of $\xi_{null}=0.995$, or 99.5%, has been used, which seems to provide reasonable performance, while ensuring miss detection probability saturation level below 1%. Based on nulling probability level, $\xi_{null}$ and estimated Rayleigh fading scale parameter, $\hat{\sigma}$, we can define the nulling threshold based on Rayleigh distribution cumulative distribution function (CDF) as:

$$T_{null} = \sqrt{-2 * \hat{\sigma}^2 \log(1 - \xi_{null})}$$

Figure 6:
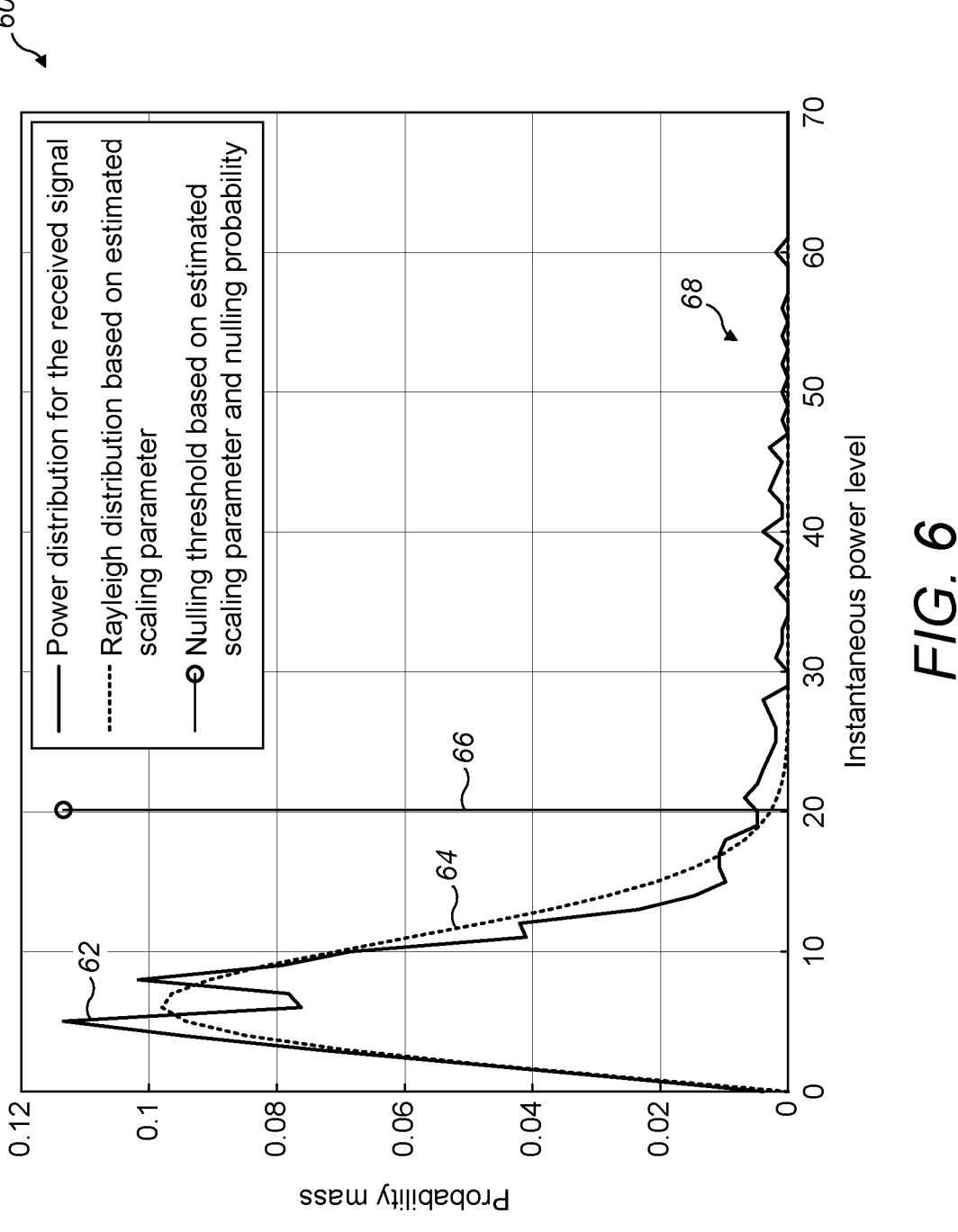

FIG. 6 is a plot, indicated generally by the reference numeral 60, showing features of an example embodiment. The plot 60 includes a detected power distribution 62, a fitted Rayleigh distribution 64 and a nulling threshold 66.

The detected power distribution 62 is determined from time domain (TD) samples, such as the samples obtained in the operation 41 of the algorithm 40 described above.

The fitted Rayleigh distribution 64 is an example of the estimated power distribution generated in the operation 42 of the algorithm 40.

As described above, the detected power distribution 62 may be assumed to approximate to a Rayleigh power distribution and the fitted Rayleigh distribution may be generated by determining a Rayleigh fading scale parameter of the time domain samples (for example based on a median value of the time domain samples).

The nulling threshold 66 is a filtering threshold value (i.e. the filtering threshold value determined in operation 43 of the algorithm 40). The filtering threshold value is set at a level at which a time domain sample is deemed to be due to interference, based on a defined probability level of the estimated power distribution.

The plot 60 includes a portion 68 above the nulling threshold 66, which data samples relate to peak indices exceeding the nulling threshold. The peak indices exceeding the nulling threshold are located. Then, the peak indices are nulled (thereby implementing the operation 45 of the algorithm 40). In the simplest solutions, only the located peak indices are nulled, as illustrated in the plot 50. Alternatively, as described further below, samples neighbouring the peak indices may be attenuated. This may be advantageous due to the assumption that the interference peaks are not ideal impulses but slightly spread in the time domain presentation. The amount of spreading may depend, at least in part, on the used IFFT size. In one example embodiment, it was assumed that FFT/IFFT size is always the next power of 2 that is larger than the used PRACH preamble length, defined as $N_{(I)FFT}=2^{ceil(log2(N_{PRACH}))}$.

Figure 7:
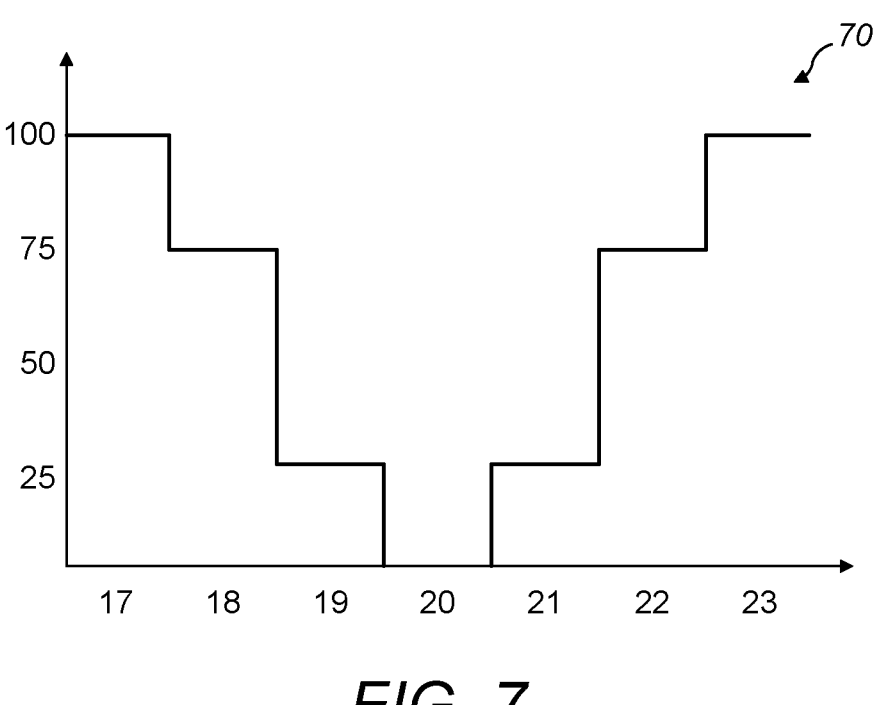

FIG. 7 is a plot, indicated generally by the reference numeral 70, showing features of an example embodiment. The plot 70 shows an example power scaling mask for performing peak nulling. The plot 70 plots a degree to which a time domain signal in a particular time slot is allowed to pass (from 0% to 100%).

At time slot 20, the filtering degree is 0, indicating that the signal in that time slot is nulled (i.e. reduced to zero). At time slots 19 and 21 (either side of the nulling time slot) the filtering degree is 25. Similarly, at time slots 18 and 22, the filtering degree is 75. Thus, the plot 70 shows a power scaling mask for peak nulling corresponding to $w_{mask}=[0.75\;0.25\;0\;0.25\;0.75]^{T}$. The idea is that that the "0" is located at the peak index, and neighbouring sample powers are scaled with respect to the given scaling mask. Of course, the particular values described above and shown in FIG. 7 are provided by way of example only; many variants are possible. Similarly, the general shape of the plot 70 could be different to that presented.

If multiple peaks are in close proximity, then overlapping masks may occur. In this scenario, a single mask may be generated, for example based on a minimum power level for all overlapping masks.

Figure 8:
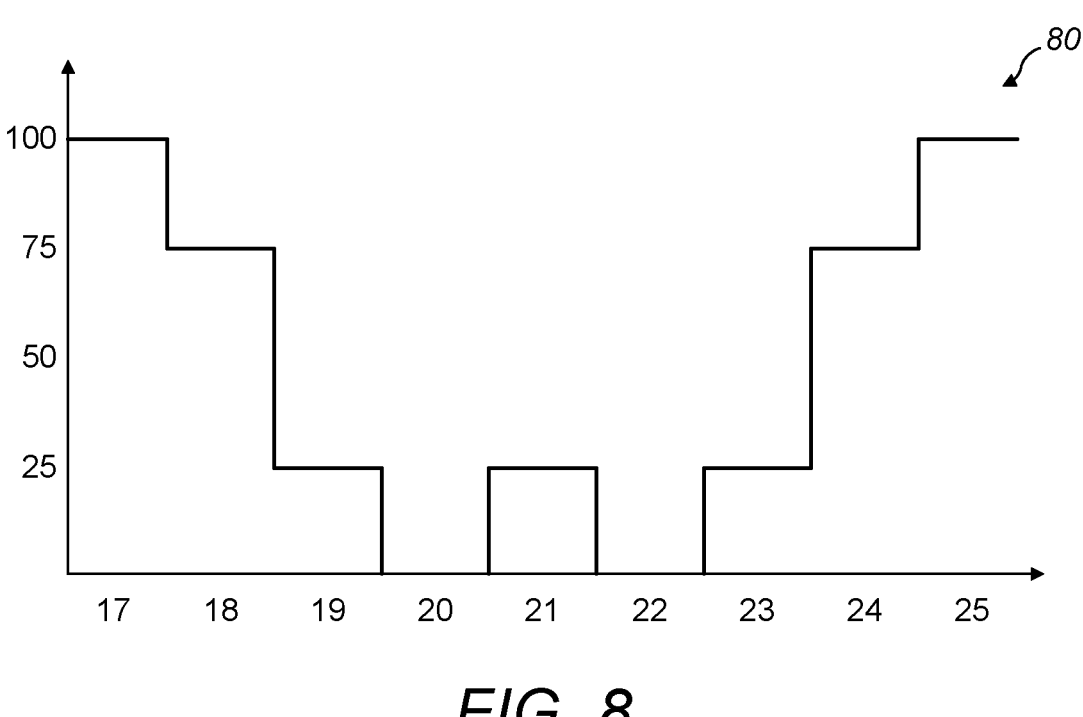

By way of example, FIG. 8 is a plot, indicated generally by the reference numeral 80, showing features of an example embodiment. The plot 80 shows an example power scaling mask for performing peak nulling in which two filtering masks are combined—one mask centred on the time sample 20, the other centred on the time sample 22.

In the plot 80, the smaller of the two overlapping masking levels is selected at each time slot, but this is not the only possible embodiment. For example, an average masking level at any particular time slot could be selected or some other combinations of masks could be provided.

The spikes that are clearly visible in the plots 30 and 50 described above tend to occur when the level of interference from the PUSCH channels is high. This can occur, for example, if a guard band between PUSCH channels and the PRACH is small. The algorithm 40 may be highly effective in the event of significant interference, but less effective if the interference (and hence the spikes) is smaller. Accordingly, in some circumstances, if the level of interference is low, then the masking/nulling algorithms described above may be disabled.

Figure 9:
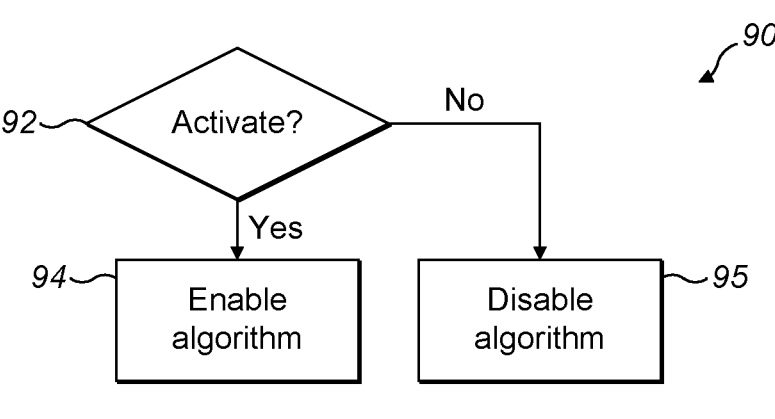
FIG. 9 is a flow chart showing an algorithm in accordance with an example embodiment.

FIG. 9 is a flow chart showing an algorithm, indicated generally by the reference numeral 90, in accordance with an example embodiment.

The algorithm 90 starts at operation 92, where a determination of whether to activate said applying said filtering mask to the time domain samples to generate the filtered signal samples is made. If so, the algorithm 90 moves to operation 94, where the masking algorithm (e.g. the algorithm 40 described above) is enabled. Otherwise, the masking algorithm is disabled at operation 95.

The operation 92 may take many forms. For example, the operation 92 may be based on a received enable signal. Alternatively, or in addition, the operation 92 may be based on a determination of whether peaks above a threshold level are detected within signal samples.

The principles described herein may be used in combination with other known techniques, such as power normalisation, to mitigate PUSCH interference.

The principles described herein may be used to detect PRACH preambles in a number of scenarios, such as where a large power offset exists between PRACH and PUSCH channels and/or where large SCS is used in the PUSCH channel. The principles described herein may, for example, be particularly relevant in New Radio (NR) applications, where different SCSs are supported for operation in FR1 and FR2.

Figure 10:
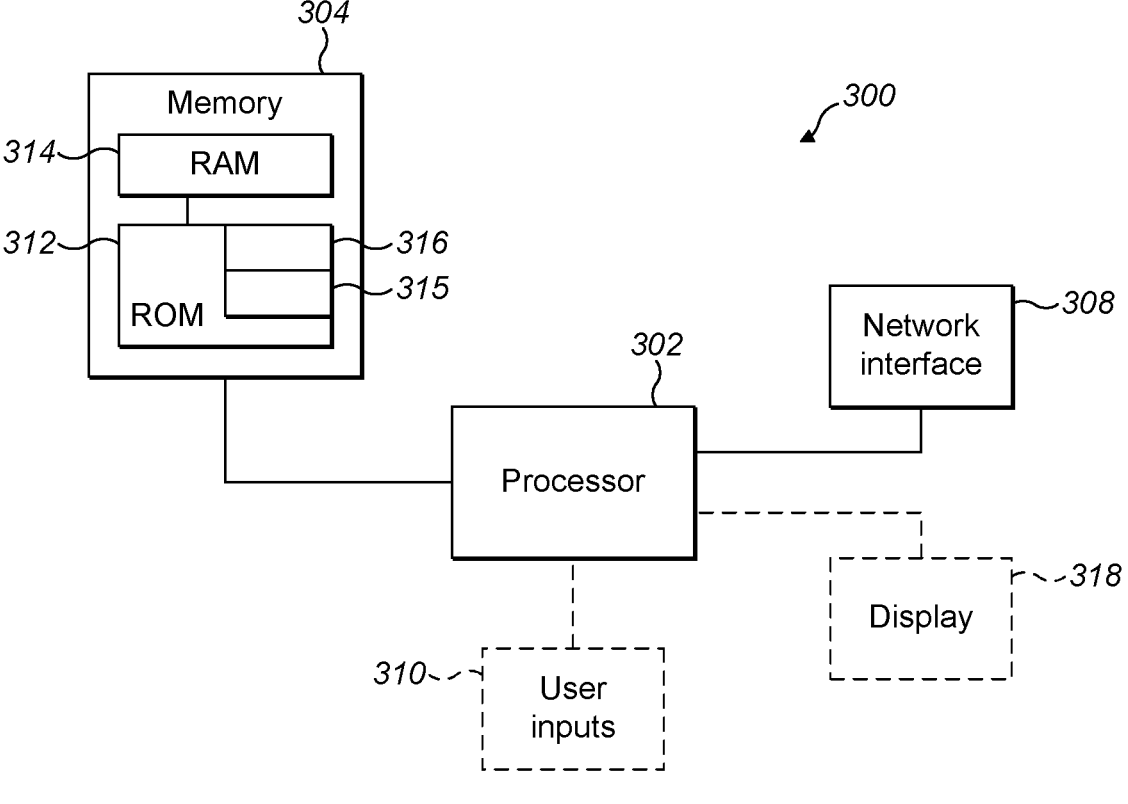
FIG. 10 is a block diagram of components of a system in accordance with an example embodiment.

For completeness, FIG. 10 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40 and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 11A:
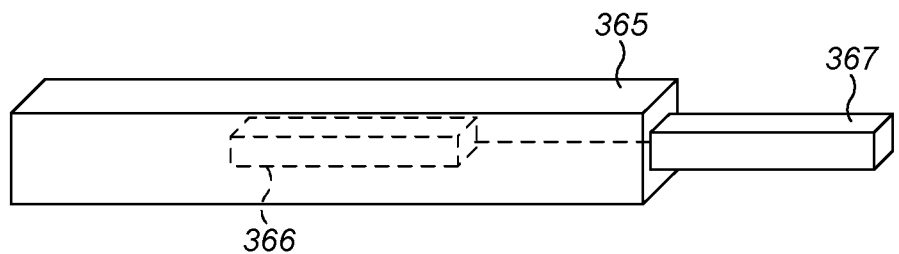
FIGS. 11A and 11B show tangible media, respectively a removable non-volatile memory unit and a compact disc (CD) storing computer-readable code which when run by a computer perform operations according to example embodiment.
Figure 11B:
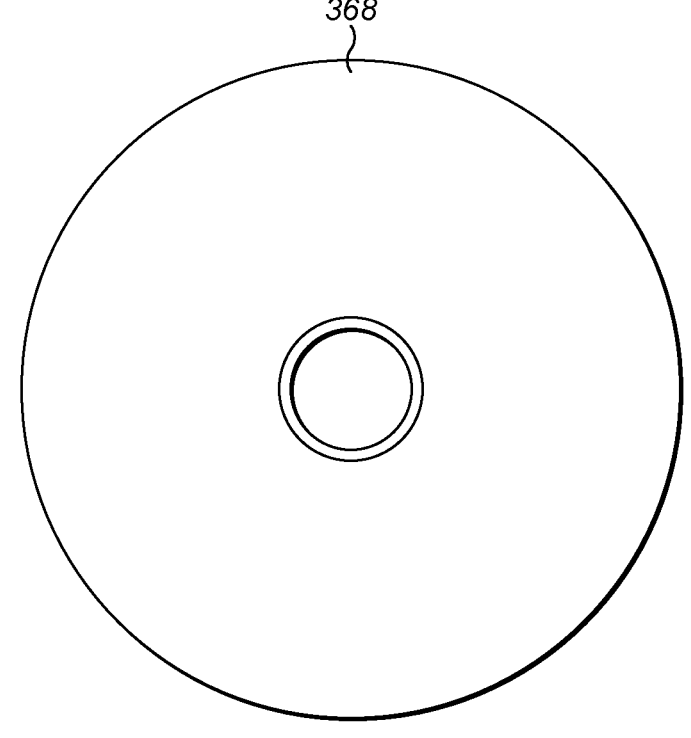

FIGS. 11A and 11B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4 and 9 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:
1. An apparatus comprising:
at least one processor; and
at least one memory including computer program code, which when executed with the at least one processor, causes the apparatus to:
obtain time domain samples of a received radio frequency signal of a mobile communication system, wherein the radio frequency signal comprises a Physical Random Access Channel;
determine an estimated power distribution for the time domain samples;
determine a filtering threshold value at which a time domain sample is deemed to be due to interference, based on a defined probability level of the estimated power distribution;
define a filtering mask based on the time domain samples and the filtering threshold value; and
apply the filtering mask to the time domain samples to generate filtered signal samples, wherein the filtering mask is configured to attenuate time domain samples that are above the filtering threshold value, and wherein the filtering mask is configured to null the time domain samples that are above the filtering threshold value.

2. The apparatus of claim 1, wherein the filtering mask is configured to attenuate time domain samples that neighbour said time domain samples that are above the filtering threshold value.

3. The apparatus of claim 1, wherein the estimated power distribution for the time domain samples is a Rayleigh distribution.

4. The apparatus of claim 3, wherein the computer program code causes the apparatus to determine a Rayleigh fading scale parameter of the time domain samples for use in generating said estimate power distribution, wherein said Rayleigh fading scale parameter is determined based on a median value of said time domain samples.

5. The apparatus of claim 1, wherein the computer program code causes the apparatus to determine whether to activate said applying said filtering mask to the time domain samples to generate the filtered signal samples, and wherein said determination is based on a received enable signal and/or on a determination of whether peaks above a filtering threshold value are detected within said time domain samples.

6. The apparatus of claim 1, wherein the computer program code causes the apparatus to generate a combined filtering mask in the event of overlapping masks.

7. The apparatus of claim 1, wherein the computer program code causes the apparatus to define the probability level of the estimated power distribution.

8. The apparatus of claim 1, wherein the computer program code causes the apparatus to detect a Physical Random Access Channel preamble within the filtered radio frequency signal.

9. A method comprising:
obtaining time domain samples of a received radio frequency signal of a mobile communication system, wherein the radio frequency signal comprises a Physical Random Access Channel;
determining an estimated power distribution for the time domain samples;
determining a filtering threshold value at which a time domain sample is deemed to be due to interference, based on a defined probability level of the estimated power distribution;
defining a filtering mask based on the time domain samples and the filtering threshold value; and
applying the filtering mask to the time domain samples to generate a filtered signal samples, wherein the filtering mask is configured to attenuate time domain samples that are above the filtering threshold value, and wherein the filtering mask is configured to null the time domain samples that are above the filtering threshold value.

10. The method of claim 9, wherein the filtering mask is configured to attenuate time domain samples that neighbour said time domain samples that are above the filtering threshold value.

11. The method of claim 10, wherein the estimated power distribution for the time domain samples is a Rayleigh distribution.

12. The method of claim 11, further comprising determining a Rayleigh fading scale parameter of the time domain samples for use in generating said estimate power distribution.

13. The method of claim 12, wherein said Rayleigh fading scale parameter is determined based on a median value of said time domain samples.

14. The method of claim 13, further comprising determining whether to activate said applying said filtering mask to the time domain samples to generate the filtered signal samples.

15. The method of claim 14, wherein said determination is based on a received enable signal and/or on a determination of whether peaks above a filtering threshold value are detected within said time domain samples.

16. The method of claim 15, further comprising generating a combined filtering mask in the event of overlapping masks.

17. The method of claim 16, further comprising defining the probability level of the estimated power distribution.

18. The method of claim 17, further comprising detecting a Physical Random Access Channel preamble within the filtered radio frequency signal.

19. A non-transitory computer-readable medium comprising instructions, when executed by an apparatus, cause the apparatus to perform at least the following:

obtain time domain samples of a received radio frequency signal of a mobile communication system, wherein the radio frequency signal comprises a Physical Random Access Channel;

determine an estimated power distribution for the time domain samples;

determine a filtering threshold value at which a time domain sample is deemed to be due to interference, based on a defined probability level of the estimated power distribution;

define a filtering mask based on the time domain samples and the filtering threshold value; and apply the filtering mask to the time domain samples to generate filtered signal samples, wherein the filtering mask is configured to attenuate time domain samples that are above the filtering threshold value; and detect a Physical Random Access Channel preamble within the filtered radio frequency signal.

* * * * *